United States Patent

Schubert

[11] Patent Number: 6,039,450
[45] Date of Patent: *Mar. 21, 2000

[54] EXTERIOR REARVIEW MIRROR WITH CABLE PULL ADJUSTMENT

[75] Inventor: Jan Schubert, Wedemark, Germany

[73] Assignee: Bernhard Mittelhäuser, Wedemark, Germany

[*] Notice: This patent is subject to a terminal disclaimer.

[21] Appl. No.: 09/126,036

[22] Filed: Jul. 29, 1998

[30] Foreign Application Priority Data

Jul. 29, 1997 [DE] Germany .............................. 197 32 456

[51] Int. Cl.[7] .............................. G02B 7/182; B60R 1/06
[52] U.S. Cl. .......................... 359/872; 359/875; 359/876; 74/502.1
[58] Field of Search ..................... 359/872, 875, 359/876; 74/500.5, 501.5 R, 501.6, 502.1

[56] References Cited

U.S. PATENT DOCUMENTS

| | | | |
|---|---|---|---|
| 2,931,245 | 4/1960 | Jacobson | 74/502.1 |
| 3,183,736 | 5/1965 | Jacobson . | |
| 3,195,370 | 7/1965 | Smith | 74/502.1 |
| 3,247,722 | 4/1966 | Jacobson | 74/502.1 |
| 3,253,481 | 5/1966 | Warhol | 74/502.1 |
| 3,286,545 | 11/1966 | Malachowski | 74/502.1 |
| 3,369,427 | 2/1968 | Brighton et al. | 74/502.1 |
| 3,712,149 | 1/1973 | Van Noord | 74/502.1 |
| 4,103,560 | 8/1978 | Stoffel et al. | 74/502.1 |
| 4,640,142 | 2/1987 | Cummins et al. | 359/872 |
| 5,737,972 | 4/1998 | Jenssen et al. | 74/502.1 |

FOREIGN PATENT DOCUMENTS

| | | | |
|---|---|---|---|
| 2715335 | 10/1978 | Germany | 74/502.1 |
| 1952699 | 1/1997 | Germany . | |
| 1401779 | 7/1975 | United Kingdom | 74/502.1 |

*Primary Examiner*—Ricky D. Shafer
*Attorney, Agent, or Firm*—Robert W. Becker & Associates

[57] ABSTRACT

An exterior rearview mirror for a motor vehicle has a housing with a mirror pane pivotably connected therein. A first and a second and cable pull have first ends connected to the mirror pane. The first and second cable pulls act on the mirror pane in a same direction to pivot the mirror pane about a first axis and act on the mirror pane opposite directions to pivot the mirror pane about a second axis extending perpendicularly to the first axis. The first and second cable pulls have second ends. A transverse member is provided, and the second ends of the cable pulls are connected to opposite ends of the transverse member. A ball joint is connected to the housing. An actuating lever is connected to the ball joint and is accessible from the interior of the vehicle for actuating the ball joint. An arm is connected to the transverse member and the ball joint. The arm extends at an angle to the actuating member such that the transverse member is positioned laterally adjacent to the ball joint when viewing the ball joint and the transverse member from the interior of the vehicle in the direction of the actuating lever.

5 Claims, 3 Drawing Sheets

EXTERIOR REARVIEW MIRROR WITH CABLE PULL ADJUSTMENT

BACKGROUND OF THE INVENTION

The present invention relates to an exterior rearview mirror with cable pull adjustment whereby two cable are provided which can be pulled, as desired, in the same direction or opposite directions in order to thereby adjust the mirror body about a first or a second transverse axis extending at a right angle to one another.

The invention relates also to mirrors of the aforementioned kind in which a ball joint is provided that can be actuated by an actuating lever. The ball of the ball joint is connected by an arm to a transverse member which has connected thereto the spaced apart fastening locations for the two cable pulls.

In known mirrors of this kind (German patent application 195 26 991) the actuating lever engages the ball of the ball joint at the side facing the interior of the vehicle while the arm with the transverse member is positioned at the opposite side of the ball joint. Such a construction has the disadvantage that the ball joint together with the aforementioned members is relatively large and has a great depth, which, however, cannot be accommodated in all cases, for example, when the socket in which the ball joint is to be housed must be embodied relatively flat and narrow.

These disadvantages are to be avoided by the exterior rearview mirror of the present invention in order to be able to employ the aforementioned mirror even in mirror housings, respectively, their sockets having a flat design.

SUMMARY OF THE INVENTION

As a solution to this object, the inventive arm connected to the ball of the ball joint is positioned at an angle, preferably a right angle, to the actuating lever such that the transverse member, when viewed in the direction of the actuating lever, respectively, when viewed from the interior of the vehicle, is positioned laterally adjacent to the ball of the ball joint. Accordingly, the arm no longer is positioned on an extension of the actuating lever, but extends practically at a right angle thereto and therefore requires only a minimal mounting depth. The socket of the mirror housing can thus be embodied to be flat and narrow and can be positioned closely adjacent to the vehicle skin. It is especially advantageous to embody the arm such that it extends substantially vertically in a downward direction so as to engage with its upper end the ball of the ball joint.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
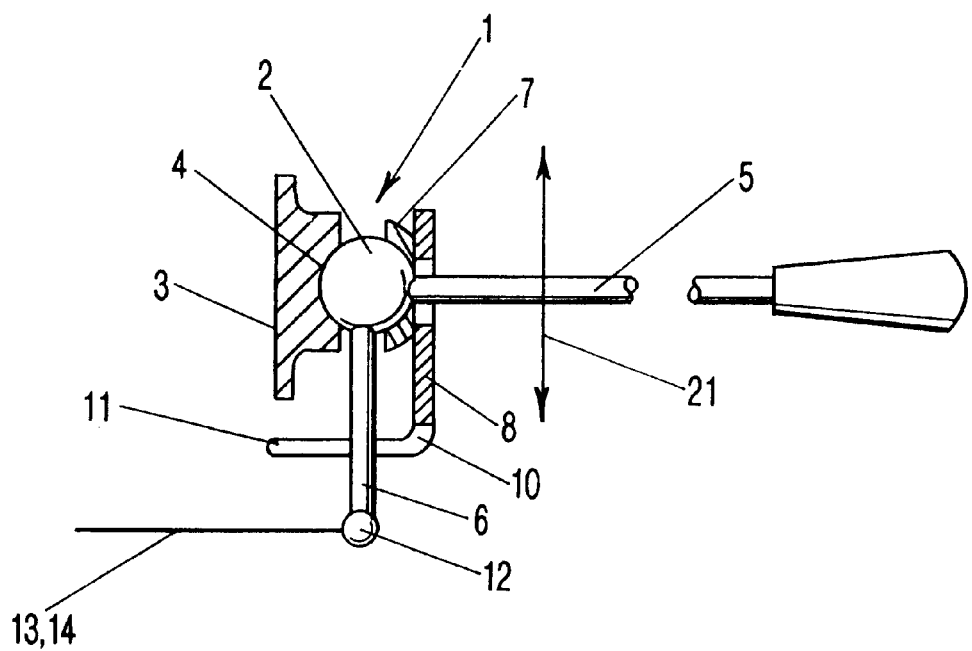
FIG. 1 shows a vertical cross-sectional view of the socket of the mirror housing of an exterior rear view mirror for a vehicle, whereby the section shows the actuating lever and the ball joint to be activated therewith.
Figure 2:
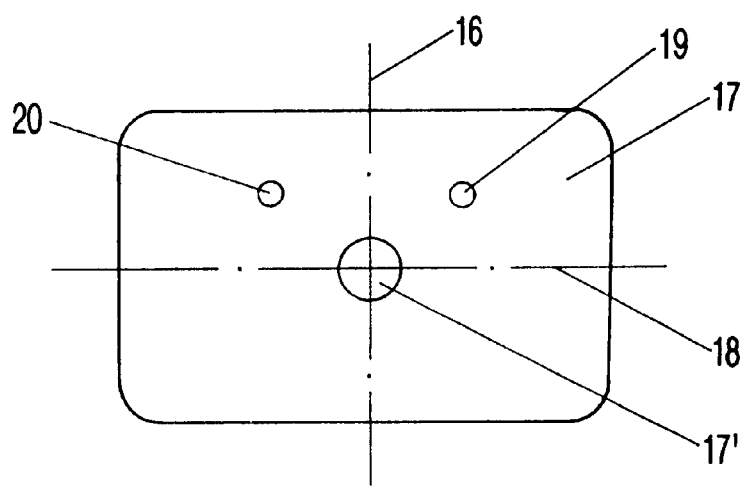
FIG. 2 shows the mirror pane of the mirror in a view from the rear.
Figure 3:
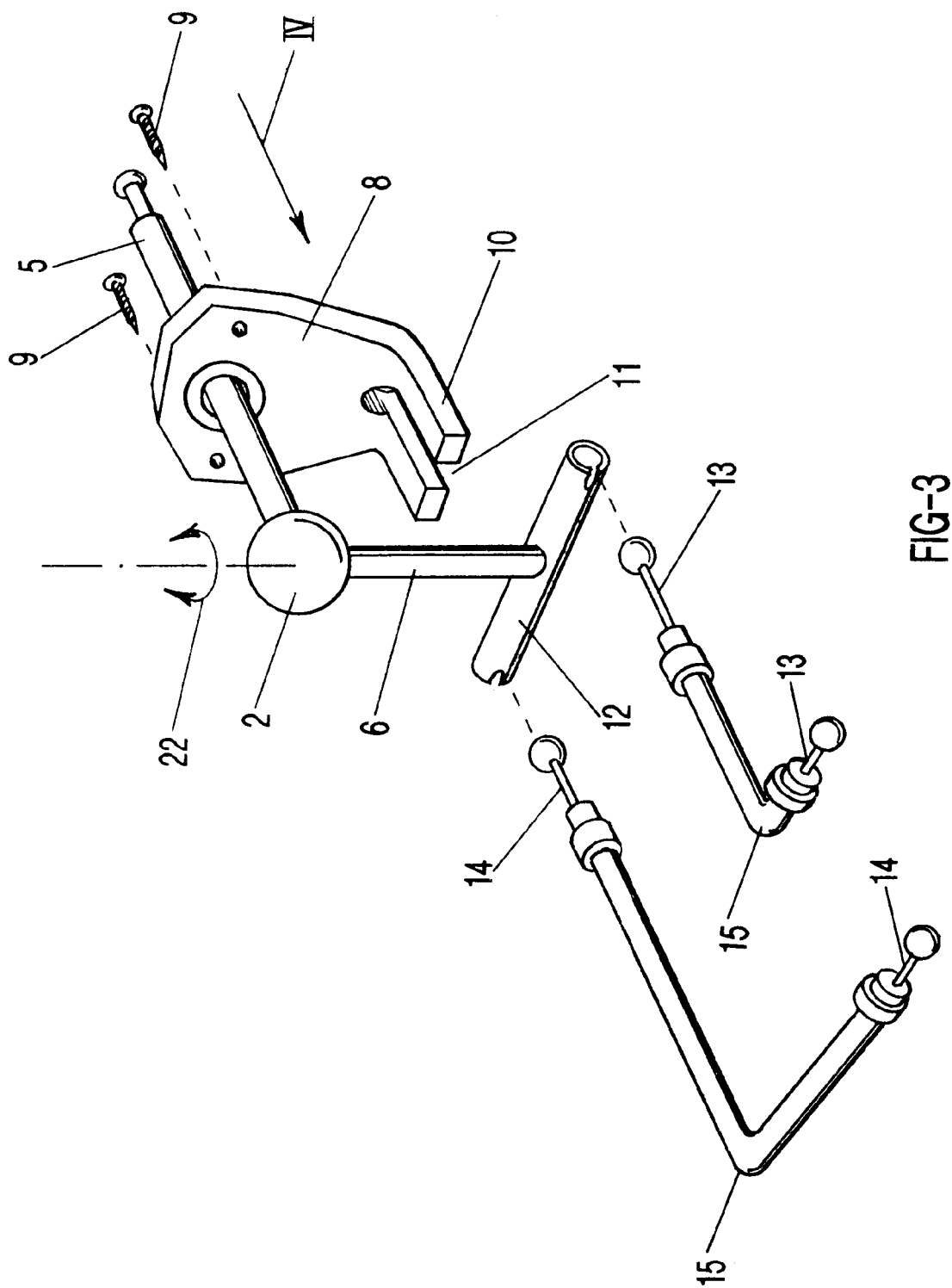
FIG. 3 shows a perspective exploded view of the ball joint area viewed from the side facing away from the actuating.
Figure 4:
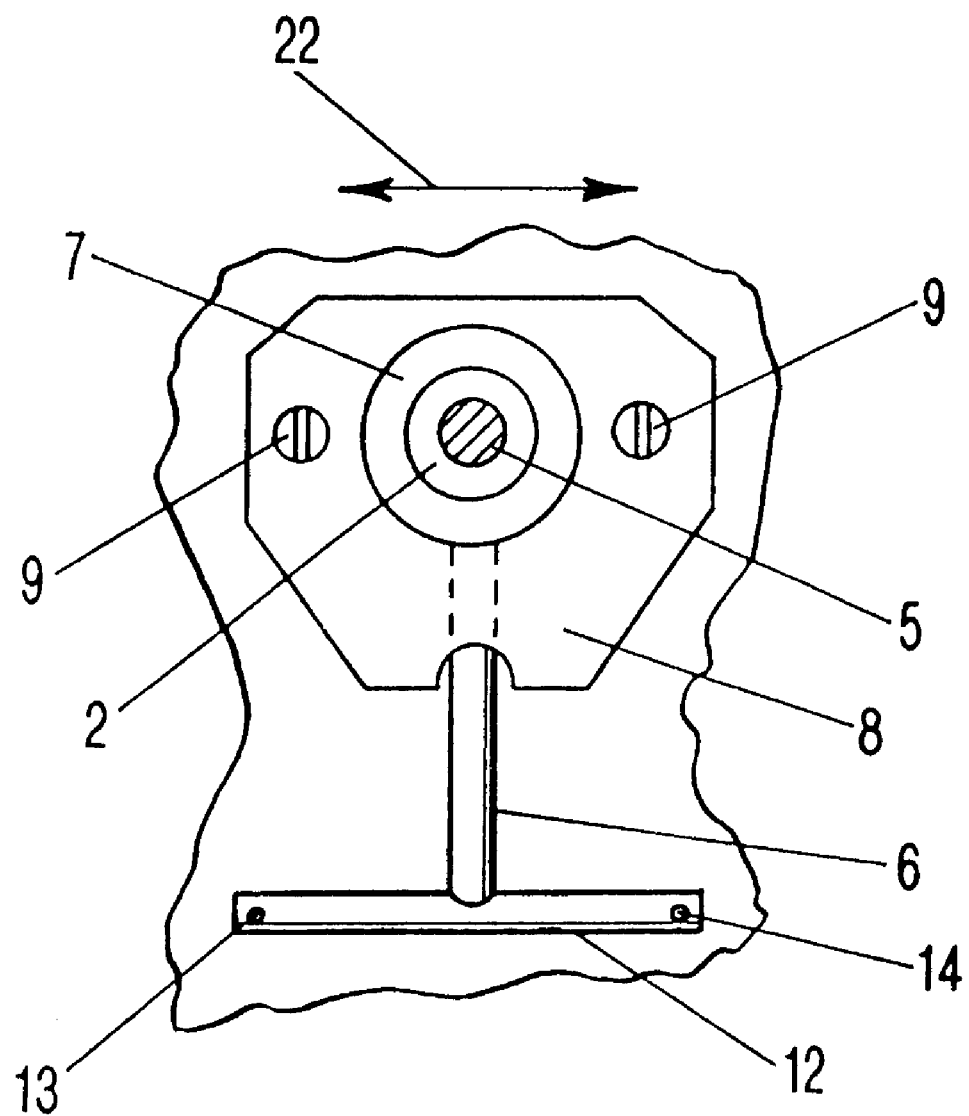
FIG. 4 shows a view in the direction of arrow IV of FIG. 3.

The present invention will now be described in detail with the aid of several specific embodiments utilizing FIGS. 1 through 4.

The portion of the ball joint 1 with ball 2 facing away from the vehicle is formed by the wall 3 of the mirror housing socket. The holder for the ball 2 is indicated with reference numeral 4. An actuating lever 5 is connected to the ball 2 and extends into the interior of the vehicle in a substantially horizontal arrangement. A vertically extending arm 6 is connected to the ball 2 at a right angle to the actuating lever 5 and extends in the downward direction. A disc 7 engaging the ball 2 is provided and is connected to an angle piece 8 having a vertically extending leg. This leg is secured by two screws 9 that connect the elements of the ball joint 1 to one another and also to the wall 3.

The substantially horizontally extending portion 10 of the angle piece 8 is fork-shaped with slot 11. It extends horizontally outwardly (relative to the vehicle) into the interior of the mirror housing. Within the slot 11 the arm 6 is guided below the ball joint 1.

At the free lower end of the arm 6 a horizontally extending transverse member 12 is arranged connected at a right angle to the arm 6, respectively, to the actuating lever 5. The ends of the transverse member 12 are engaged by two steel cables, 13, 14 which, in the manner of Bowden cables, are secured without play in non-displaceably supported flexible sleeves 15 so that they are pull-resistant as well as pressure resistant in the longitudinal direction. The two cables 13,14 engage pivotably the backside of the mirror pane 17 on opposite sides of a vertical axis 16 of the mirror pane 17 within the mirror housing, whereby the spacing between the engagement location and the vertical axis 16 is identical to the spacing to horizontal axis 18. The two engagement locations of the cables 13, 14 at the back side of the mirror pane 17 are indicated with reference numerals 20, 19 and the ball joint that is required for a pivotable support of the mirror pane 17 is indicated by reference numeral 17'. This ball joint 17' is centrally arranged at the mirror pane.

With respect to manipulation and function, it should be noted that a pivoting action of the actuating lever 5 in the direction of double arrow 21, respectively, in the up ward or downward direction, results in a displacement of the arm 6 within the slot 11. Accordingly, the transverse member 12 also performs a respective movement to the front or rear. The two cables 13,14 are thus synchronously moved in the same direction so that a pivoting of the mirror pane 17 about the horizontal axis 18 is realized.

However, when the actuating lever 5 is horizontally moved in the direction of double arrow 22, a respective rotation of the arm 6 and thus a rotation of the transverse member 12 will occur. The cables 13,14 are then moved in opposite directions. This results in a pivoting action of the mirror pane 17 about the vertical axis 16.

It is thus possible, by pivoting the actuating lever 5 to a respective side or in the upward or downward direction, to provide the desired mirror adjustment with only two cables 13,14 without requiring return springs or similar means for acting on the mirror pane 17.

It should be noted that optionally the disc 7 can be eliminated. In this case, the vertical leg of the angle piece 8 must be embodied accordingly and rest or engage the ball 2. It is also obvious from the drawings that the adjustment of the mirror pane 17 without a return spring is possible exclusively with the two cables 13,14.

The specification incorporates by reference the disclosure of German priority document 197 32 456.8 of Jul. 29, 1997.

The present invention is, of course, in no way restricted to the specific disclosure of the specification and drawings, but also encompasses any modifications within the scope of the appended claims.

What is claimed is:

1. An exterior rearview mirror for a motor vehicle, said mirror comprising:

a housing (3) having a mirror pane (17) pivotably connected in said housing (3);

first and second cable pulls (13, 14, 15) having first ends connected to said mirror pane (17);

said first and second cable pulls (13, 14, 15) acting on said mirror pane (17) in a same direction to pivot said mirror pane (17) about a first axis (18) and acting on said mirror pane (17) in opposite directions to pivot said mirror pane (17) about a second axis (16) extending perpendicular to said first axis (18);

said first and second cable pulls (13, 14, 15) having second ends;

a transverse member (12);

said second ends of said first and second cable pulls (13, 14, 15) connected to opposite ends of said transverse member (12);

a ball joint (2, 4, 7) connected to said housing (3);

an actuating lever (5) connected to said ball joint (2, 4, 7) and accessible from an interior of the vehicle for actuating said ball joint (2, 4, 7);

an arm (6) connected to said transverse member (12) and said ball joint (2, 4, 7);

said arm (6) extending at an angle to said actuating lever (5) such that said transverse member (12) is positioned laterally adjacent to said ball joint (2, 4, 7) when viewing said ball joint (2, 4, 7) and said transverse member (12) from the interior of the vehicle in a direction of said actuating lever (5);

a guide in which said arm (6) is guided, said guide (11) extending in a direction of said actuating lever (5) such that, when said actuating lever (5) is moved in an upward or downward direction said arm (6) is moved back and forth in said guide (11) to thereby cause a transverse movement of said transverse member (12) and a movement of said first and second cable pulls (13, 14, 15) in said same direction.

2. A mirror according to claim 1, wherein said arm (6) extends downwardly from said ball joint (2, 4, 7).

3. A mirror according to claim 2, wherein said arm (6) extends vertically downwardly from said ball joint (2, 4, 7).

4. A mirror according to claim 2, wherein said transverse member (12) is connected to a lower end of said arm (6) and is positioned at an angle of 90° to said arm (6).

5. A mirror according to claim 1, wherein a lateral movement of said actuating lever (5), said arm (6) is rotated about a longitudinal axis thereof and said transverse member (12) is rotated to thereby cause a movement of said first and second cable pulls (13, 14,1 5) in said opposite directions.

* * * * *